US005983296A

United States Patent [19]
Lamkin et al.

[11] Patent Number: 5,983,296
[45] Date of Patent: Nov. 9, 1999

[54] METHOD AND APPARATUS FOR TERMINATING BUSSES HAVING DIFFERENT WIDTHS

[75] Inventors: Brian Eric Lamkin, Wichita; Raymond S. Rowhuff, Valley Center; Kenneth J. Thompson, Wichita, all of Kans.

[73] Assignee: LSI Logic Corporation, Milpitas, Calif.

[21] Appl. No.: 08/995,222

[22] Filed: Dec. 19, 1997

Related U.S. Application Data

[63] Continuation of application No. 08/433,915, May 2, 1995, abandoned.

[51] Int. Cl.⁶ .................................................. G06F 13/00
[52] U.S. Cl. ........................ 710/100; 710/101; 710/126; 710/127
[58] Field of Search .................................. 395/280, 281, 395/282, 306, 307, 882, 892; 710/100, 101, 102, 127, 126, 62, 72

[56] References Cited

U.S. PATENT DOCUMENTS

| | | | |
|---|---|---|---|
| 4,220,876 | 9/1980 | Ray | 307/296 |
| 4,748,426 | 5/1988 | Stewart | 333/22 |
| 4,831,283 | 5/1989 | Newton | 307/443 |
| 4,920,339 | 4/1990 | Friend et al. | 340/825.52 |
| 4,965,723 | 10/1990 | Kirk et al. | 395/307 |
| 5,029,284 | 7/1991 | Feldbaumer et al. | 307/443 |
| 5,099,137 | 3/1992 | Lattin, Jr. | 307/147 |
| 5,101,481 | 3/1992 | Anger et al. | 395/325 |
| 5,120,909 | 6/1992 | Kutz et al. | 178/63 R |
| 5,157,771 | 10/1992 | Losi et al. | 395/325 |
| 5,191,581 | 3/1993 | Woodbury et al. | 370/85.9 |
| 5,204,669 | 4/1993 | Dorfe et al. | 340/825.52 |
| 5,239,559 | 8/1993 | Brach et al. | 375/36 |
| 5,239,658 | 8/1993 | Yamamuro et al. | 395/800 |

(List continued on next page.)

FOREIGN PATENT DOCUMENTS

| | | | |
|---|---|---|---|
| 0531630 | 3/1993 | European Pat. Off. | G06F 13/40 |
| 0645716 | 8/1994 | European Pat. Off. | G06F 13/40 |
| 0575237 | 6/1993 | France | G06F 13/12 |
| 64-14624 | 1/1989 | Japan . | |
| 1259442 | 10/1989 | Japan . | |
| 5224792 | 9/1993 | Japan . | |
| 0 645 716 A1 | 3/1995 | United Kingdom | G06F 13/40 |
| 9408305 | 4/1994 | WIPO | G06F 13/40 |

OTHER PUBLICATIONS

"Automatic Small Computer System Interface Termination Circuit for Narrow/Wide Devices on Wide Bus" IBM Technical Disclosure Bulletin. vol.40, No. 4, Apr. 1997, New York, US, pp. 79–82, XP000728275.

"BI–0316 Mass Storage Module" Dec. 6, 1996, Brand Innovators B.V. XP002071927. Available from Internet<URL: http//www.brandinnovators.com/manual/bi0316/book_33.htm>.

IBM Technical Disclosure Bulletin; Adapter for Operating 16–Bit Devices on 8–Bit Small Computer System Interfaces; vol. 38, No. 07; Jul. 1995; pp. 141–143.

*Primary Examiner*—Ayaz R. Sheikh
*Assistant Examiner*—Ario Etienne

[57] ABSTRACT

A method and apparatus for providing automatic termination of cables coupled to an adapter card is described. The presence or absence of devices attached to such cables are sensed. A terminator circuit is selectively activated to provide termination for the cables depending on the configuration of devices attached to the adapter card. In one embodiment, a plurality of dissimilar types of devices having different data widths are attached to a common adapter card via a plurality of cables. The cables provide for interconnection of devices to the adapter card via a bus protocol. The signals to/from the cables are sourced/sinked from a controller chip. A terminator circuit in close proximity to the controller chip is selectively activated to provide termination for the host side of the bus, depending on the types of devices attached to the bus.

9 Claims, 4 Drawing Sheets

U.S. PATENT DOCUMENTS

| | | | |
|---|---|---|---|
| 5,265,038 | 11/1993 | Kwok | 364/572 |
| 5,313,105 | 5/1994 | Samela et al. | 307/99 |
| 5,313,595 | 5/1994 | Lewis et al. | 395/325 |
| 5,327,114 | 7/1994 | Straate et al. | 340/286.06 |
| 5,338,979 | 8/1994 | Mammano et al. | 307/443 |
| 5,367,647 | 11/1994 | Coulson et al. | 395/325 |
| 5,382,841 | 1/1995 | Feldbaumer | 326/30 |
| 5,410,141 | 4/1995 | Koenck et al. | 235/472 |
| 5,422,580 | 6/1995 | Mandel et al. | 326/30 |
| 5,434,516 | 7/1995 | Kosco | 326/30 |
| 5,450,425 | 9/1995 | Gunn et al. | 371/67.1 |
| 5,455,926 | 10/1995 | Keele et al. | 395/404 |
| 5,465,042 | 11/1995 | Samela et al. | 324/71.1 |
| 5,467,453 | 11/1995 | Kocis | 395/281 |
| 5,469,554 | 11/1995 | Tucker et al. | 395/325 |
| 5,473,264 | 12/1995 | Mader et al. | 326/30 |
| 5,495,584 | 2/1996 | Holman, Jr. et al. | 395/308 |
| 5,510,701 | 4/1996 | Samela et al. | 324/71.1 |
| 5,511,229 | 4/1996 | Tsujimoto | 395/851 |
| 5,546,017 | 8/1996 | Vitunic | 326/30 |
| 5,553,250 | 9/1996 | Miyagawa et al. | 395/309 |
| 5,555,510 | 9/1996 | Verseput et al. | 364/514 |
| 5,564,024 | 10/1996 | Pemberton | 395/283 |
| 5,568,046 | 10/1996 | Samela et al. | 324/71.1 |
| 5,574,946 | 11/1996 | Sala | 395/825 |
| 5,583,448 | 12/1996 | Corder et al. | 326/30 |
| 5,585,741 | 12/1996 | Jordan | 326/30 |
| 5,586,271 | 12/1996 | Parrett | 395/283 |
| 5,613,074 | 3/1997 | Galloway | 395/280 |
| 5,664,221 | 9/1997 | Amberg et al. | 395/829 |
| 5,680,537 | 10/1997 | Byers et al. | 395/182.03 |
| 5,680,555 | 10/1997 | Bodo et al. | 395/306 |
| 5,715,409 | 2/1998 | Bucher et al. | 395/309 |
| 5,751,977 | 5/1998 | Alexander | 395/306 |
| 5,764,925 | 6/1998 | Noonan | 395/281 |
| 5,768,621 | 6/1998 | Young | 395/844 |

# METHOD AND APPARATUS FOR TERMINATING BUSSES HAVING DIFFERENT WIDTHS

CROSS REFERENCE TO RELATED APPLICATION

This is a Continuation of application Ser. No. 08/433,915 filed on May 2, 1995 now abandoned.

BACKGROUND OF THE INVENTION

Computers typically have numerous types of cabling used to connect various sub-assemblies within such computer. When computer busses (or other type of interfaces containing plural electrical signals) are connected from one sub-assembly to another via cabling, it is possible that termination circuits are required to improve the quality of electrical signals traveling through the cabling. These termination circuits modify the effective impedance 'seen' by the electrical signals, and reduce reflections which might otherwise occur in a non-terminated cable.

Circuits used to terminate a cable connecting a disk controller with a disk drive typically consist of a resistor-pack, or RPAK, containing a plurality of resistors in a discrete package. The given resistor in the RPAK would be connected to a given conductor in the cable. Each resistor in the RPAK typically has a resistance value substantially equal to the resistance value of a single conductor within an interconnecting cable. These RPAKs are manually inserted and removed from a disk drive electronic card, depending on where the particular disk drive is with respect to the interconnecting cable and other disk drives that may be attached to such cable. For example, a given cable may be daisy-chained, where a plurality of connectors are dispersed at various intervening locations across the length of a cable. For the disk drive located at the end of an interconnecting cable, an RPAK would be inserted to properly terminate the cable. For disk drives plugged into intermediate locations within a 'daisy-chained' cable connection, the RPAKs are removed.

An example of the above described cable interconnection scheme is a small computer system interface, or SCSI, bus. This is a common bus used for interconnecting a plurality of disk drives to a disk controller. Another popular disk drive interconnection bus is known as IDE. Both of these busses use termination circuits to terminate interconnecting cables.

Originally, the number of data bits in these SCSI and IDE busses was eight (8) bits. With the higher performance computer systems in existence today, the need to expand these data paths to sixteen (16) bits or greater has evolved. However, this evolution has caused problems in maintaining compatibility between newer sixteen bit wide bus interfaces and the older eight bit wide bus interfaces.

There is a growing movement to ease operator set-up when installing or removing devices in a computer, particularly in the world of personal computers. Various types standards are being defined to ease the burden on the end user when modifying the configuration of his/her computer. One such standard is known as Plug-n-Play, whose primary objective is to reduce the number of hardware/software changes that are required to a particular computer system when modifying its internal structure or make-up.

Plug-n-Play systems currently allow for the auto-termination of eight bit busses. For such a system, there are two connectors and one terminator RPAK (with eighteen resistors), as there are eighteen conductors that need to be terminated in an eight bit SCSI bus (eight data lines and ten control/status lines). However, with the advent of sixteen bit busses, a problem exists on how to provide for auto-termination of systems having a combination of dissimilar bus widths.

Some systems provide auto-termination at the peripheral side of the SCSI bus, such as that described by Lewis et al in U.S. Pat. No. 5,313,595, which is hereby incorporated by reference. However, this type of system does not address auto-termination on the host side of the SCSI bus, or how to deal with complexities relating to a plurality of dissimilar types of SCSI devices having dissimilar data widths.

It is an object of the present invention to provide an improved interconnection system.

It is a further object of the present invention to provide an interconnection system for Plug-n-Play types of systems.

It is yet another object of the present invention to provide a method and system for automatically determining the types of devices on an interconnecting bus, and providing proper termination of interconnections for such bus.

It is still another object of the present invention to provide a method and system for automatically terminating interconnecting cables in a system having a plurality of dissimilar bus widths.

SUMMARY OF THE INVENTION

A method and apparatus for providing automatic termination of cables coupled to an adapter card. The presence or absence of devices attached to such cables are sensed. A terminator circuit is selectively activated to provide termination for the cables depending on the configuration of devices attached to the adapter card. In one embodiment, a plurality of dissimilar types of devices having different data widths are attached to a common adapter card via a plurality of cables. The cables provide for interconnection of devices to the adapter card via a bus protocol. The signals to/from the cables are sourced/sinked from a controller chip. A terminator circuit in close proximity to the controller chip is selectively activated to provide termination for the host side of the bus, depending on the types of devices attached to the bus.

DETAILED DESCRIPTION OF THE PREFERRED EMBODIMENT

Figure 1:
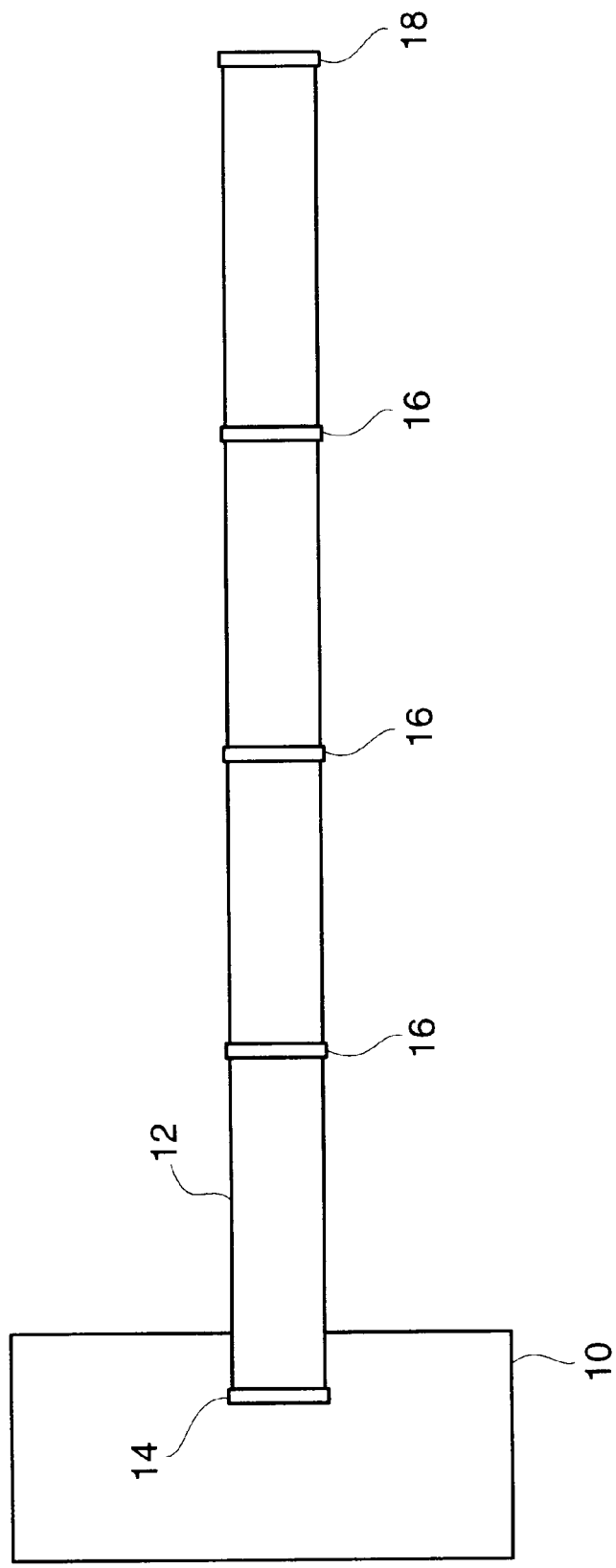
FIG. 1 shows an adapter card and interconnect cable having a plurality of connectors.

FIG. 1 shows an adapter card 10, having an interconnecting cable 12 attached thereto. This interconnecting cable typically has a connector 14 that allows the cable to be releasably connected to a receiving connector on the adapter card 10. The adapter card 10 is sometimes referred to as a host adapter card when used as part of a SCSI bus interconnection scheme. The name comes from the fact that the adapter card would be plugged into a bus connector of a host computer (not shown), and provides the electrical and programming interface between a host central processor, and peripheral components attached to the interconnect cable 14. These peripheral components plug into the cable at various intervening and ending locations across the span of the cable, such as at connector locations 16 and 18.

Figure 2:
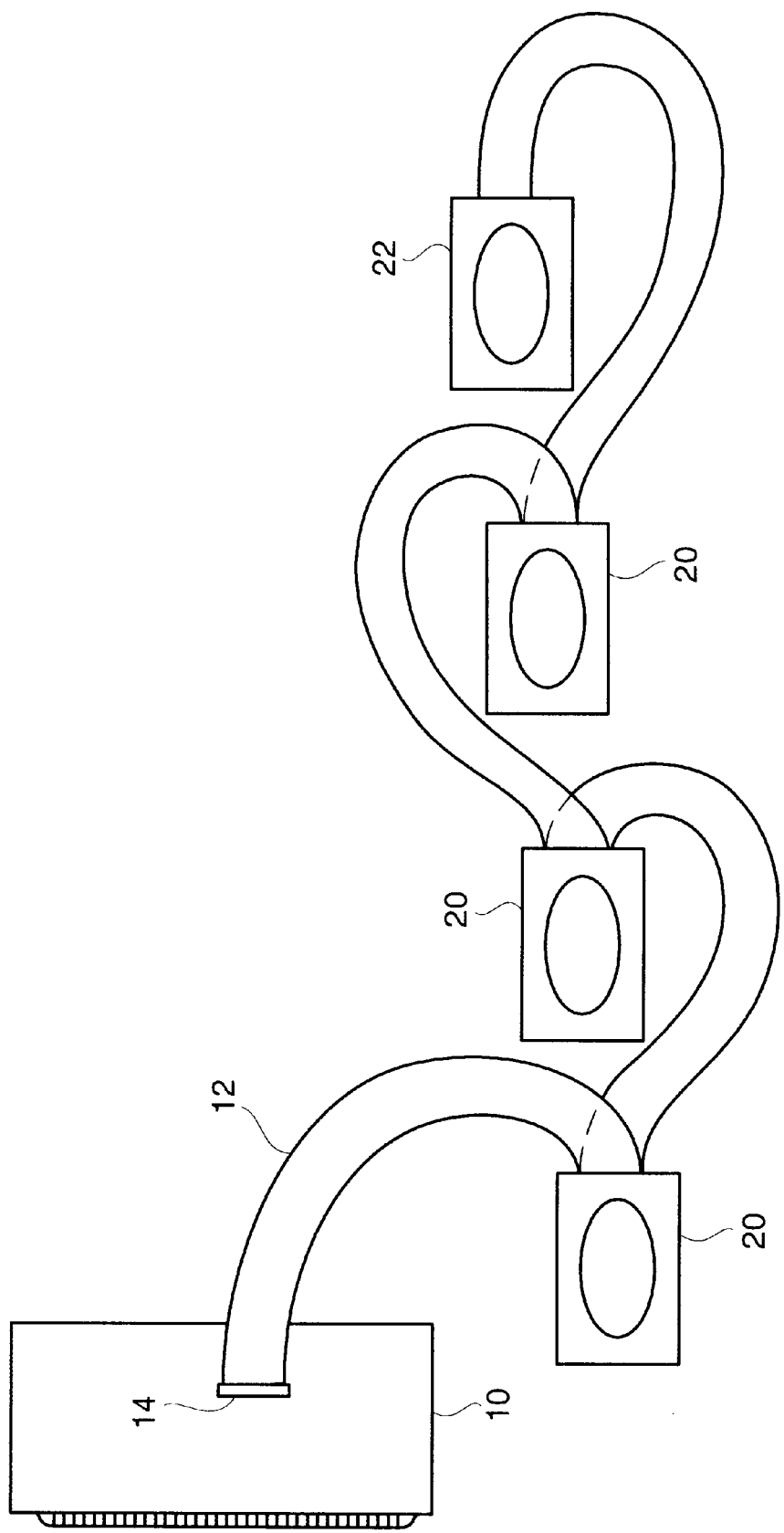
FIG. 2 shows an adapter card and a plurality of peripheral devices coupled together with an interconnect cable in a daisy-chain fashion.

FIG. 2 shows a typical SCSI bus, where a plurality of peripheral devices 20 such as disk drives are connected to interconnecting cable 12. Other types of SCSI-compliant devices could also be similarly connected, such as tape drives, compact disk (CD) drives, and the like. As can be seen, a single interconnecting cable couples a plurality of devices to a controller 10. This controller is preferably a separate hardware card plugged into the internal bus of a computer, but could alternatively be integrated circuitry on the main system board of the computer, such as a motherboard.

In the preferred embodiment, each of these peripheral devices 20 has a means for coupling a terminating circuit to the interconnecting cable. This may consist of a socket, where an RPAK can be manually inserted, or a jumper or switch that can be used to manually enable the terminating circuit. As previously described, it is desirable to only couple a terminator circuit to the ends of the interconnect cable, for example at locations 14 and 18 of FIG. 1. Hence, the device 22 which is plugged into the end of the cable would have its terminator circuit enabled. In a similar fashion, a terminator circuit on adapter card 10 terminates the other end of cable 12.

Figure 3:
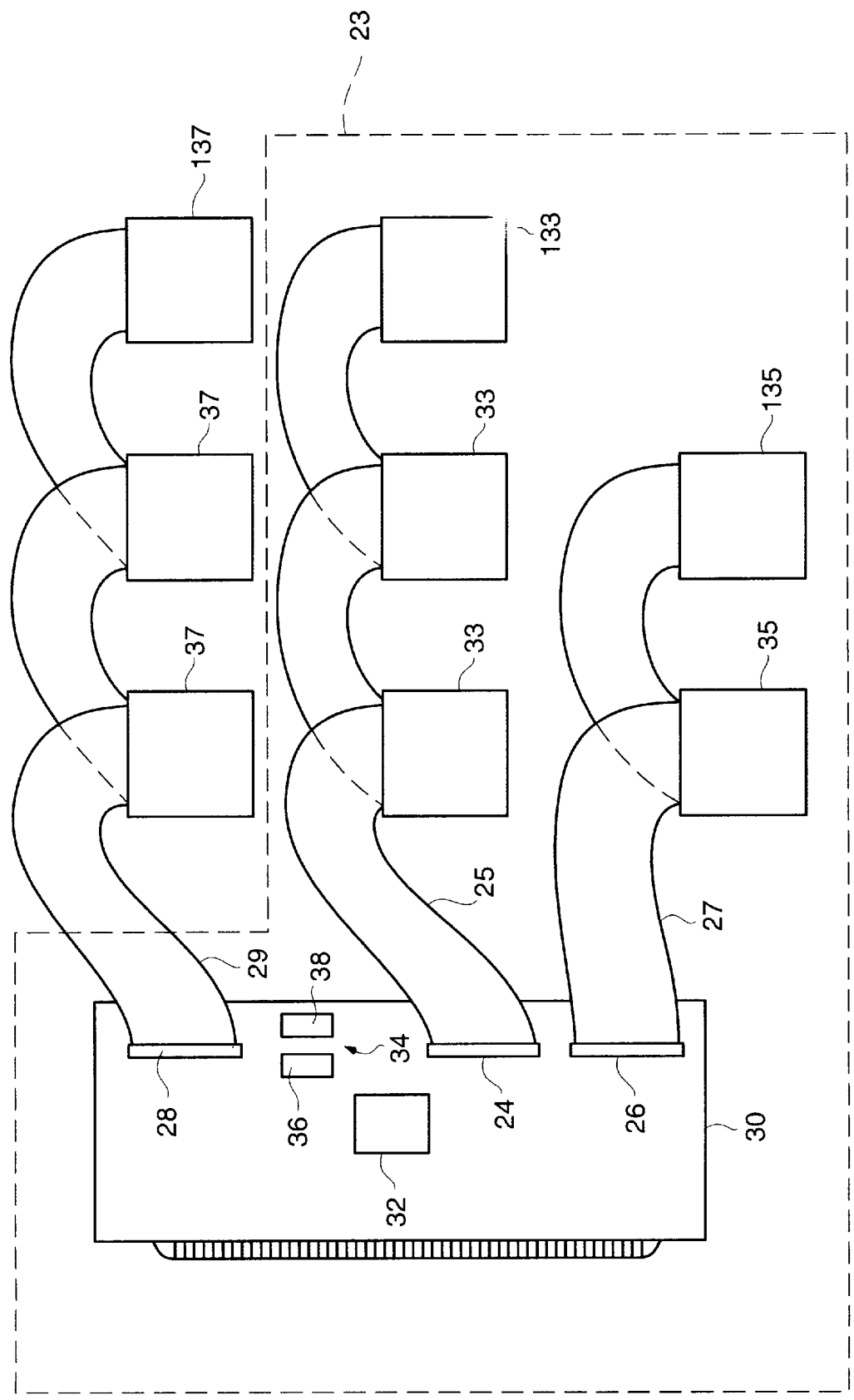
FIG. 3 shows an adapter card having a plurality of dissimilar cable types coupled thereto, for interconnecting to a plurality of dissimilar peripheral devices.

FIG. 3 shows a system where a plurality of devices having dissimilar bus widths are plugged into a common host adapter card 30. In the preferred embodiment, one 8-bit connector 24 and two 16-bit connectors 26 and 28 are provided by the host adapter 30. This configuration allows for attachment of internal 8-bit SCSI devices 33, internal 16-bit SCSI devices 35, and external 16-bit SCSI devices 37. The distinction between internal and external pertains to whether the devices are internal or external to the particular computer housing 23 that the adapter card resides in. For example, one computer configuration may have an internal 540 Mbyte hard disk drive mounted inside the housing of a personal computer, while also having an external CD-ROM disk drive laying on a desk besides the personal computer. In this configuration, an external cable couples the CD-ROM drive to the host adapter card (alternatively, the external cable from the CD-ROM drive could attach to a connector mounted on the housing of the computer, with another cable running inside the housing from the housing connector to the adapter connector). The main point here is that the adapter card has a plurality of cable connectors of dissimilar types/widths. This allows for attachment of a plurality of dissimilar types of devices (for example devices having different data widths such as 8-bit, 16-bit or 32-bit devices).

A particular feature of the present invention is to be able to selectively enable/disable a terminator circuit that resides on the host adapter card. The selective enablement/disablement of the terminator is done in response to what types of devices are plugged into the plurality of cables extending from the cable connectors 24, 26 and 28 of FIG. 3. Proper termination is required on both ends of an interconnecting cable, in order to reduce signal distortions such as reflections that can otherwise result during high speed transmission over an improperly terminated cable. The selective termination of the present invention is directed to the "host" side of the interconnect cable. Proper termination is still required at the 'peripheral' side of the interconnect cable.

Figure 4:
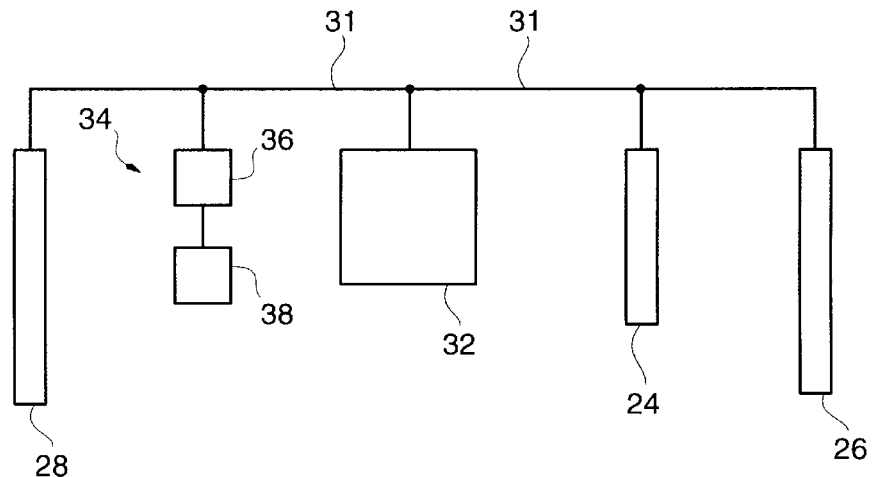
FIG. 4 shows a representation of component interconnect on the adapter card.

A representation of the interconnection between connectors 24, 26 and 28 of FIG. 3 is shown in FIG. 4. An electronic circuit 32, such as a SCSI interface controller chip 53C825 available from Symbios Logic Inc., Ft. Collins, Colo. (previously known as NCR Corporation, Microelectronics Products Division), provides an interface between the SCSI bus and host computer system. This controller chip transmits and receives data and control signals across the SCSI bus (the SCSI protocol and interface signals are well known in the art, and need not be further described herein). These are the SCSI signals that require termination. These SCSI signals are sourced/sinked at controller 32, and travel generally in a right and left direction (it is commonly understood that printed circuit board wiring of a plurality of signals in a bus do not all follow the identical physical wiring pattern, but rather general traverse from one direction to another through a series of jogs, vias, etc. to reach the ultimate wiring destination). Extending from one side of the SCSI controller chip 32 is the right fork of the SCSI bus signals 31. Approximately one inch from the controller chip 32 is the 8-bit connector 24. Approximately one inch from the 8-bit connector, and two inches from controller 32, is the 16-bit connector 26. Connectors 24 and 26 allow for attachment of internal SCSI devices via cables 25 and 27, respectively. Extending from another side of the SCSI controller chip 32 is the left fork of the SCSI bus signals 31. Approximately one inch from the controller chip 32 is a terminator circuit 34, comprising RPAK 36 and 38. Approximately one inch from the terminator circuit 34, and two inches from controller 32, is the 16-bit connector 28. Connector 28 allows for attachment of external SCSI devices via an external cable 29.

When one or more devices are plugged into a SCSI interconnect cable such as those shown on FIG. 3, one of the conductors/wires within such cable is used to signal whether or not a peripheral device is attached to such cable. For 8-bit SCSI, conductor #22 of a 50 pin cable is used for a peripheral connection indicator. This line is driven to a ground potential by an 8-bit peripheral device, when such device is plugged into an interconnect cable such as cable 25 shown in FIG. 3. For 16-bit SCSI, conductor #50 of a 68 pin cable is used for a peripheral connection indicator. This line is driven to a ground potential by a 16-bit peripheral device, when such device is plugged into an interconnect cable such as cable 27 or 29 shown in FIG. 3. Thus, by appropriate detection circuitry, it is possible to determine which, if any, devices are plugged into cables 25, 27 and 29 of FIG. 3.

Figure 5:
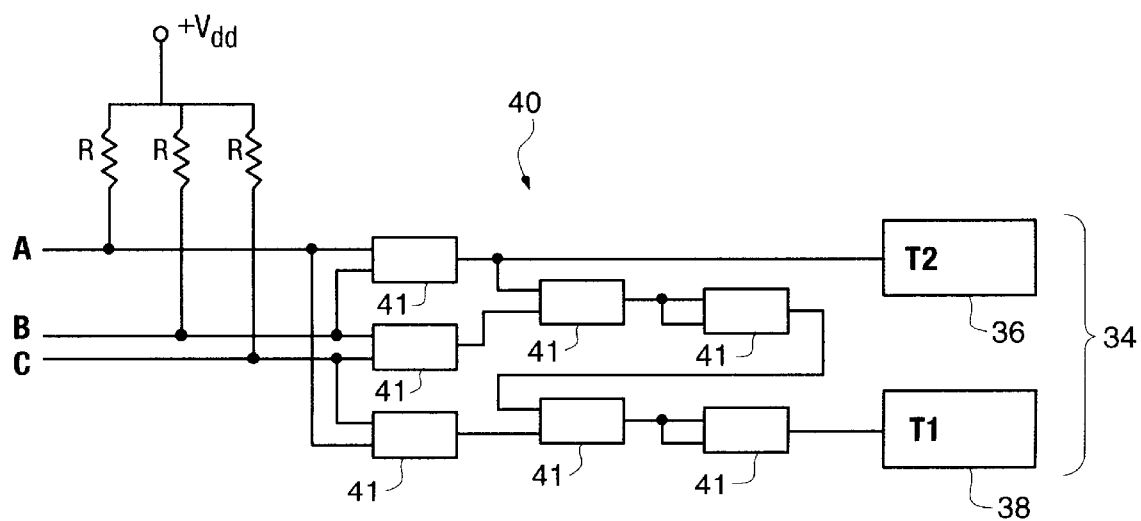
FIG. 5 is a schematic of circuitry used to detect peripheral present signals, and generate terminator circuit enable/disable signals.

Referring now to FIG. 5, there is shown circuitry which both detects which SCSI cables have peripheral devices attached thereto, and generates enable/disable signals for selectively enabling/disabling a terminator circuit 34. Three input signals A, B and C are shown. These signals correspond to the respective peripheral connection indicators signals from each of interconnect cables 25, 27 and 29. Signal A represents the signal at pin 50 of connector 28 (such pin having a signal similar to the signal on conductor #50 in cable 29). Signal B represents the signal at pin 50 of connector 26 (such pin having a signal similar to the signal on conductor #50 in cable 27). Signal C represents the signal at pin 22 of connector 24 (such pin having a signal similar to the signal on conductor #22 in cable 25). Thus, signal A represents the presence or absence of an external 16-bit device on cable 29, signal B represents the presence or absence of an internal 16-bit device on cable 27, and signal C represents the presence or absence of an internal 8-bit device on cable 25.

Signals A, B and C are 'pulled-up' by resistors R to a +Vdd voltage. In the preferred embodiment, each resistor R is 4.7 Kohms (although other values such as 1K or 10K are also possible), and +Vdd is +5 volts (although other values such as +3 volts or +12 volts are also possible). Signals A, B and C are active when at zero volts, meaning that when a peripheral device is connected to a cable, the peripheral device pulls the peripheral indicator line on that particular cable to zero volts. Thus, zero volts on the peripheral indicator line indicates that a peripheral device is attached to the adapter card via its respective cable. Signals A, B and C are coupled to a plurality of logic gates, shown in total at 40 of FIG. 5. Thus logic gates generate terminator circuit enable signals T1 and T2 based upon the voltage levels of A, B and C. The logic gates shown were derived to enable the truth table shown below in Table 1. A, B, and C signals are active low, meaning a zero for such respective value indicates a peripheral device is present. T1 is the disconnect line going to RPAK 38 of terminator circuit 34, and T2 is the disconnect line going to RPAK 36 of terminator circuit 34. A logical ONE value on the disconnect line indicates that the associated RPAK is disconnected. RPAK 38 contains a plurality of resistors for terminating the lower 8 bits and associated parity bit, and the control lines, of the SCSI bus. RPAK 36 contains a plurality of resistors for terminating the upper 8 bits and associated parity bit of the SCSI bus. In the preferred embodiment, RPAK 36 and 38 are the UC5601 Small Computer System Interface Active Terminator Chip, available from Unitrode Integrated Circuits, Merrimack N.H.

TABLE 1

| A | B | C | T1 | T2 |
|---|---|---|----|----|
| 1 | 1 | 1 | 0  | 0  |
| 1 | 1 | 0 | 0  | 0  |
| 1 | 0 | 1 | 0  | 0  |
| 1 | 0 | 0 | 1  | 0  |
| 0 | 1 | 1 | 0  | 0  |
| 0 | 1 | 0 | 1  | 0  |
| 0 | 0 | 1 | 1  | 1  |
| 0 | 0 | 0 | 1  | 1  |

Using a Karnaugh map, the following equations were established for generation of enable signals T1 and T2.

$$T1 = \overline{A+B} + \overline{B+C} + \overline{A+C}$$
$$T2 = \overline{A+B}$$

These equations are implemented by the logic circuitry 40 of FIG. 5, with blocks 41 being NOR gates.

Several representative cases will now be discussed with reference to the truth table shown in Table 1. The first line of the truth table shows the instance where A, B and C are all equal to a logical ONE (i.e. +Vdd volts). As previously described, a ground voltage (i.e. a logical ZERO) represents the presence of a peripheral device on a particular cable, so that the first line entry in Table 1 corresponds to no peripheral devices being attached to any cable. In this case, T1 and T2 are logical ZERO, meaning the both of RPAKs 36 and 38 are connected/enabled. In other words, the 'host' side of the cable has terminating resistors provided by terminator circuit 34. These terminating resistors pull-up the SCSI bus lines to some positive reference voltage, such as 2.9 volts.

The second line of the truth table, where the C input is logical ZERO, indicates the scenario where at least one 8-bit peripheral device is coupled to adapter card 30 via connector 24 and interconnect cable 25. In this instance, both of RPAKs 36 and 38 are connected/enabled to properly terminate cable 25 (an alternate embodiment allows for only RPAK 38 to be enabled—which corresponds to the low order 8 data bits, parity bit, and control signals—since the high order data bits are unused). Terminator circuit 34 provides termination with respect to the 'host' side of cable 25, and the terminator on the 8-bit peripheral device provides the termination with respect to the 'peripheral' side of cable 25. If more than one 8-bit peripheral device were connected to cable 25, as shown in FIG. 3, only the device at the end of the cable should have a terminator circuit enabled/connected.

The third line of the truth table, where the B input is logical ZERO, indicates the scenario where at least one internal 16-bit peripheral device is coupled to adapter card 30 via connector 26 and interconnect cable 27. In this instance, both of RPAKs 36 and 38 are connected/enabled. RPAKs 36 and 38 provides termination with respect to the 'host' side of cable 27, and the terminator on the 16-bit peripheral device provides the termination with respect to the 'peripheral' side of cable 27. If more than one 16-bit peripheral device were connected to cable 27, as shown in FIG. 3, only the device at the end of the cable should have a terminator circuit enabled/connected.

The fourth line of the truth table, where the B and C inputs are logical ZERO, indicates the scenario where at least one 8-bit peripheral device, and at least one internal 16-bit peripheral device, is coupled to adapter card 30 via connectors 24/26 and interconnect cables 25/27, respectively. In this instance, only RPAK 36 (which terminates the high order 8-bits and parity) is connected/enabled (RPAK 38 is disabled). The lower 8-bits and parity, and control signals, are terminated by the terminator circuit provided by the last internal 8-bit device 133 and the last internal 16-bit device 135. RPAK 36 and the last internal 16-bit device terminator provide termination for the upper 8 data bits and parity of cable 27. Again, if more than one 16-bit peripheral device were connected to cable 27, or more than one 8-bit peripheral device were connected to cable 25, only the device at the end of each respective cable should have a terminator circuit enabled/connected for proper termination of the cables.

The fifth line of the truth table, where the A input is logical ZERO, indicates the scenario where at least one external 16-bit peripheral device is coupled to adapter card 30 via connector 28 and interconnect cable 29. In this instance, both of RPAKs 36 and 38 are connected/enabled. RPAKs 36 and 38 provides termination with respect to the 'host' side of cable 29, and the terminator on the 16-bit peripheral device provides the termination with respect to the 'peripheral' side of cable 29. If more than one 16-bit peripheral device were connected to cable 29, as shown in FIG. 3, only the device at the end of the cable should have a terminator circuit enabled/connected. It should be noted that the operation of line 5 is similar to the operation of line 3. There is thus no distinction required as to whether the 16-bit peripheral device is internal or external. The only distinction actually required is whether or not a 16-bit peripheral device is plugged into the cable, be it internal or external.

The sixth line of the truth table, where the A and C inputs are logical ZERO, indicates the scenario where at least one 8-bit peripheral device, and at least one external 16-bit peripheral device, is coupled to adapter card 30 via connectors 24/28 and interconnect cables 25/29, respectively. This scenario is similar to that of table entry number 4, with the only difference being that an external 16-bit device is attached instead of an internal 16-bit device. Since this distinction has no bearing in the preferred embodiment on which terminator circuits are activated (as described above), further explanation of this entry is not required.

The seventh line of the truth table, where the A and B inputs are logical ZERO, indicates the scenario where at least one internal 16-bit peripheral device, and at least one external 16-bit peripheral device, are coupled to adapter card 30 via connectors 26/28 and interconnect cables 27/29, respectively. In this instance, both of RPAKs 36 and 38 are disconnected/disabled. This disablement of terminator circuit 34 is required since the termination circuit in the external 16-bit peripheral device provides the 'peripheral' side termination, and the termination circuit in the internal 16-bit peripheral device provides the 'host' side termination. Again, if more than one 16-bit peripheral device were connected to cable 27 or 29, as shown in FIG. 3, only the device at the end of the respective cable should have a terminator circuit enabled/connected. Since the host adapter is in the middle of the bus, termination must be supplied by the last internal peripheral device and the last external peripheral device. This can be seen with reference to FIG. 4, where a cable (not shown) extends from connector 28 to the external device, and another cable (not shown) extends from connector 26 to the internal device. Hence, the terminator circuits at the external and internal devices provide termination at both ends of the cable, notwithstanding the fact that the SCSI controller chip resides in an intervening point along the physical cable.

Line 8 of Table 1 is similar in operation to line 7, with no active termination provided by terminator circuit 34. The reasons for no active termination are similar to those given above with respect to line 7. However, the adapter card is not designed to operate with peripheral devices connected to all three connectors 24, 26 and 28, due to the long stub created by a third cable.

Although the present invention has been described with particular reference to certain preferred embodiments thereof, variations and modifications of the present invention can be effected within the spirit and scope of the following claims.

We claim:

1. In an apparatus comprising an adapter card and a plurality of interconnect cables coupled thereto, a method for automatically terminating at least one of the plurality of interconnect cables, comprising the steps of:

determining whether a first device having a first data path width is connected to at least one of the plurality of interconnect cables; and determining whether a second device having a second data path width is connected to at least one of the plurality of interconnect cables; and selectively coupling at least one terminator circuit on the adapter card to at least one of the interconnect cables.

2. The method of claim 1 wherein one of the at least two interconnect cables has X conductors, and another of the at least two interconnect cables has Y conductors, and wherein X is not equal to Y.

3. A method for automatically terminating a SCSI bus having a plurality of interconnect cables coupled to a SCSI controller, comprising the steps of:

sensing whether a device is connected to each of the interconnect cables; and selectively coupling at least one terminator circuit on the SCSI controller to the SCSI bus, wherein at least two of the interconnect cables have different data bus widths.

4. In combination, a controller card comprising a controller module, a plurality of connectors having a plurality of electrical contacts, and a terminator circuit;

a first interconnect cable coupled to one of the plurality of connectors and to a first device having a first data width;

a second interconnect cable coupled to another of the plurality of connectors and to a second device having a second data width different than the first data width; and coupling means, coupled to the terminator circuit, for selectively coupling the terminator circuit to at least one of the plurality of electrical contacts.

5. The combination of claim 4, wherein the first and second interconnect cables have dissimilar cable sizes.

6. The combination of claim 5, wherein the terminator circuit comprises a first and second portion, the first portion for selectively coupling to a first group of the plurality of electrical contacts, and the second portion for selectively coupling to a second group of the plurality of electrical contacts.

7. In an apparatus comprising an adapter card and a plurality of connectors, at least two of the plurality of connectors having different numbers of electrical contacts, a method for automatically terminating an interconnect cable coupled to one of the plurality of connectors, comprising the steps of:

determining whether a device having a first data path width is connected to the interconnect cable;

selectively coupling at least one terminator circuit on the adapter card to the interconnect cable; and a second interconnect cable coupled to another of the plurality of connectors, wherein the second interconnect cable is attached to a second device having a second data path width different than the first data path width.

8. A method for automatically terminating a data bus having a plurality of interconnect cables coupled to a controller, comprising the steps of:

sensing whether a first device having a first data path width is connected to any of the interconnect cables;

sensing whether a second device having a second data pat width different than the first data path width is connected to any of the interconnect cables;

selectively coupling at least one terminator circuit on the controller to the data bus.

9. The method of claim 8 further comprising the step of selectively coupling another terminator circuit on the controller to the data bus.

* * * * *